United States Patent

[11] 3,592,082

| [72] | Inventor | Anton Ott<br>Olgastrasse 6, Friedrichshafen, Germany |
|---|---|---|
| [21] | Appl. No. | 855,315 |
| [22] | Filed | Sept. 4, 1969 |
| [45] | Patented | July 13, 1971 |
| [32] | Priority | Sept. 6, 1968, Sept. 6, 1968 |
| [33] | | Germany |
| [31] | | Z 12 079 and Z 12 078 |

[54] PLANETARY GEAR TRANSMISSION WITH INTERCONNECTED PLANET CARRIERS
8 Claims, 9 Drawing Figs.

| [52] | U.S. Cl. | 74/761 |
|---|---|---|
| [51] | Int. Cl. | F16h 57/10 |
| [50] | Field of Search | 74/761 |

[56] References Cited
UNITED STATES PATENTS

| 2,947,199 | 8/1960 | Doidge et al. | 74/761 |
| 3,024,668 | 3/1962 | Kronogard et al. | 74/761 |
| 3,188,885 | 6/1965 | Fisher | 74/761 |
| 3,308,687 | 3/1967 | Borman, Jr. | 74/761 |
| 3,400,609 | 9/1968 | Utter | 74/761 |

Primary Examiner—C. J. Husar
Attorney—Karl F. Ross

ABSTRACT: An automotive transmission with two cascaded planetary gear trains has the two planet carriers rigidly connected with each other and with the output shaft, the input shaft being alternatively connectable with one sun and one ring gear (forward) and other sun gear (reverse) or with one ring gear only (forward) and the two rigidly interconnected sun gears (reverse); in the latter case, one of the gear trains has two sets of intermeshing planet gears to invert the sense of relative rotation of the interconnected sun gears and planet carriers during operation in reverse gear.

INVENTOR:
Anton Ott
BY
Karl F. Ross
Attorney

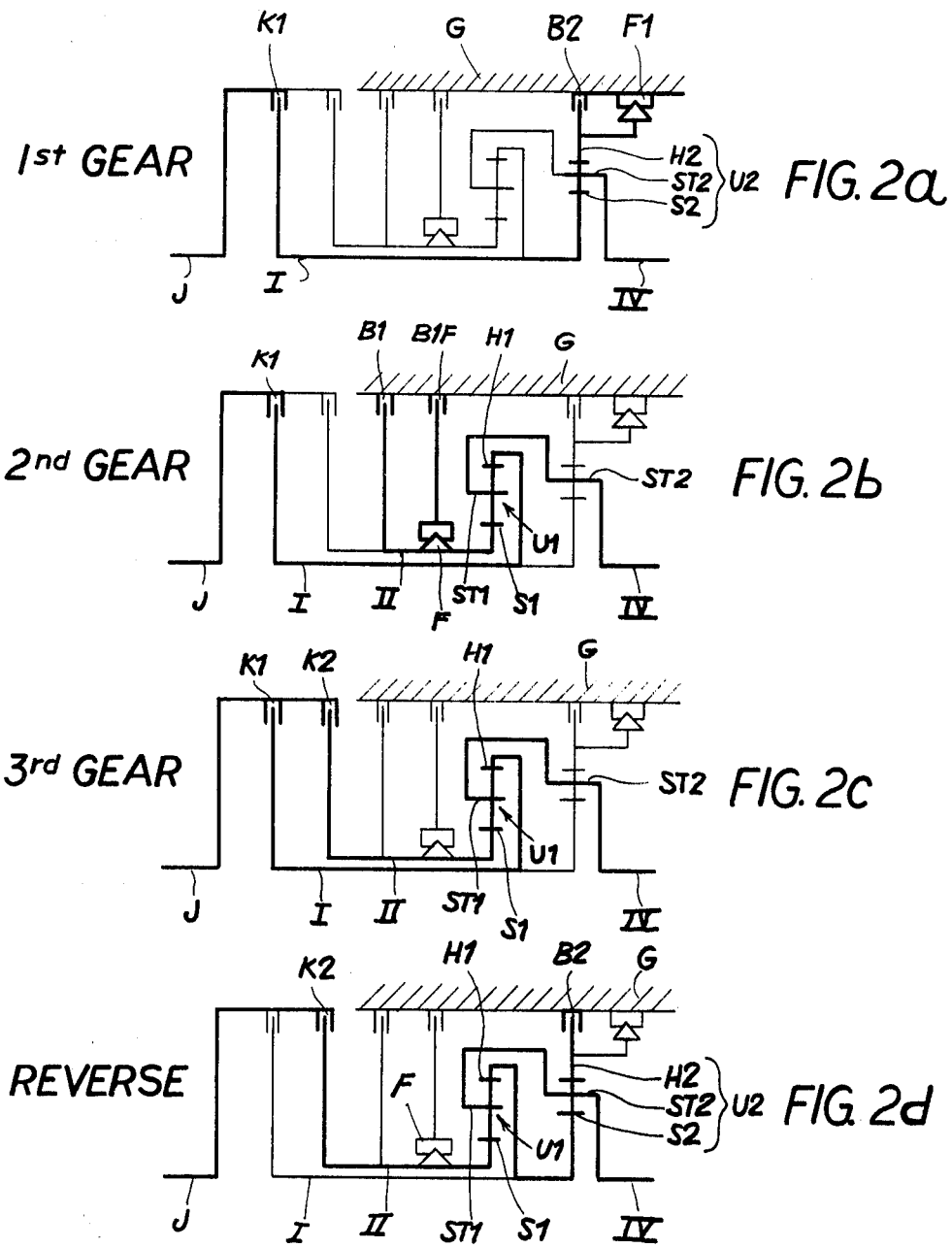

PLANETARY GEAR TRANSMISSION WITH INTERCONNECTED PLANET CARRIERS

My present invention relates to an automotive transmission of the type wherein an input shaft, driven by the vehicular engine (generally with interposition of a fluid coupling), is operatively connectable with an output shaft (leading to the traction wheels of the vehicle) through a pair of cascaded planetary gear trains with the aid of selectively actuatable clutches and brakes.

In such a system, e.g., as disclosed in U.S. Pat. No. 2,856,794 to H. W. Simpson, three forward speed ratios or "gears" and one reverse speed ratio can be established by alternatively or jointly coupling the input shaft with two of the six components (two sun gears, two ring gears and two planet carriers) of the two planetary gear trains and by selectively arresting two other components thereof, the establishment of any power train thus requiring the concurrent actuation of two preferably hydraulic coupling elements (clutches and/or brakes). Since the presence of six independently controllable components creates a much larger number of possible power trains than is required in a three-speed transmission, the design of any transmission of this type requires a reduction of the available degrees of freedom by rigidly interconnecting two components of one planetary gear train with two components (not necessarily of the same type) of the other gear train. This leaves four independently rotatable constituents of which one (at least) must be coupled with the input shaft, another must be coupled with the output shaft, and a third must be arrested (or, for direct drive, also joined with the input shaft); the fourth constituent is left floating but will rotate at a speed related to those of the input and output shafts by the dissimilar transmission ratios of the two gear trains. For continuity in shifting between the different forward speeds, it is also desirable to have the input shaft connected to the same component or combination of components in every position other than reverse gear.

Even with these restrictions, there are still numerous possibilities of using two clutches and two brakes in the establishment of the four power trains commonly used for automotive drives. The number of these possibilities is increased by the fact that either or both planet carriers may support more than one set of planet gears per carrier, the use of two intermeshing planet gears or sets of planet gears not only resulting in a reversal of relative sense of rotation between sun gear and ring gear but also introducing a further ratio-determining parameter. As shown in commonly owned German Pat. No. 1,178,307, for example, the use of two meshing planetary gears in one gear train enables the omission of the ring gear from the other gear train.

In the aforementioned Simpson patent, the rigidly interconnected components are (a) the two sun gears and (b) the ring gear of the first and the planet carrier of the second planetary gear train; the two clutches serve to connect the input shaft with the second ring gear and/or with the interconnected sun gears, the output shaft being fixedly connected with the first ring gear and therefore also with the second planet carrier.

The object of my present invention is to provide a transmission system of this general type but of more compact construction, by virtue of the use of a common planet carrier for the two planetary gear trains.

In accordance with my present invention, the rotatable body carrying the planet gears of the two gear trains is rigid with the output shaft of the system, the input shaft being operatively connectable with one of the two ring gears by a first clutch and with either or both of the two sun gears by a second clutch. As in the transmission of the Simpson patent, the two sun gears may be interconnected for joint rotation although, in this case, my system calls for the provision of two intermeshing planet gears (or sets of such planet gears) in one of the gear trains in order to invert the sense of relative rotation of the interconnected sun gears and planet carriers during reverse operation. In fact, the two interconnected sun gears may be merged into a single sun gear meshing with one planet gear (or set of planet gears), the latter in turn meshing with the corresponding ring gear and with the other planet gear (or set of planet gears) engaging the other ring gear.

In the detailed description which follows, it will be convenient to distinguish between first and second sun gears, planet carriers and ring gears even though the two planet carriers form a unitary structure.

The invention will be described in greater detail with reference to the accompanying drawing in which:

FIGS. 2a, 2b, 2c and 2d are views similar to FIG. 1 but illustrating the system in four different operating conditions respectively corresponding to the three forward positions and the reverse position of the system;

Figure 1:
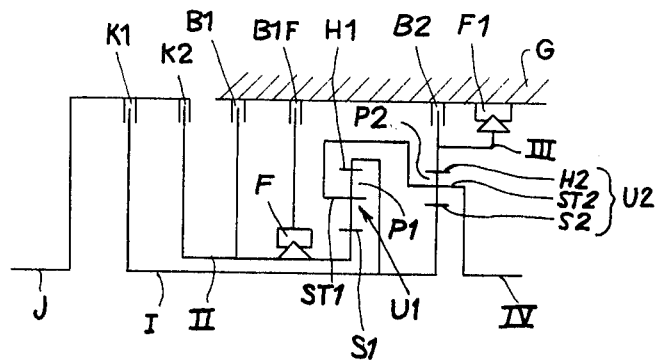
FIG. 1 is a diagrammatic view of a transmission embodying my present invention.

In conformity with conventional diagrammatic representation, the drawing shows only those parts of the planetary gear trains which lie above the common axis of their sun and ring gears.

In all the embodiments disclosed, the system comprises an input shaft J driven from an engine shaft via a hydraulic torque converter, now shown, in the manner described in the above-identified Simpson patent and commonly owned German patent specification. Two hydraulic clutches K1, K2 are individually actuatable to couple the shaft J with an intermediate central shaft I or with a surrounding tubular shaft II. Clutch K1 is invariably actuated for each of the three forward speeds (first, second and third gear); clutch K2 is actuated for third gear ("high speed") as well as for reverse drive. For second gear ("intermediate speed"), shaft II can be arrested by a first hydraulic brake B1 mounted on the gear housing G, a second such brake B2 being engageable with the body III of one of the ring gears of two planetary gear trains U1, U2 to arrest that ring gear for first gear ("low speed") and reverse.

In a manner well known per se, e.g. as described in the above-identified German patent specification, brakes B1 and B2 may be supplemented by overrunning clutches or freewheels for smoother shifting. Thus, brake B1 works in parallel with an optional brake B1F, which engages the shaft II through a freewheel F and goes into action slightly before brake B1, whereas brake B2 is assisted by a parallel-connected freewheel F1 mounted directly on housing G. These freewheels prevent reverse rotation of shaft II and body III, respectively, which is sufficient for establishment of the corresponding forward speeds but allows the driven shaft IV to outrun its drive; for speed reversal and for slowing a vehicle traveling downhill, a bidirectional braking action is necessary.

In the system of FIG. 1, the first planetary gear train U1 comprises a sun gear S1 rigid with shaft II, a planet carrier ST1 rigid with shaft IV, and a ring gear H1 rigid with shaft I. The second planetary gear train U2 has a sun gear S2 rigid with shaft I and ring gear H1, a second planet carrier ST2 rigid with shaft IV and therefore with planet carrier ST1, and a ring gear H2 whose body III is arrestable by brake B2 and freewheel F1 as described above. Planet gears P1 and P2 of gear trains U1 and U2 mesh directly with their respective sun and ring gears.

The four different power trains establishable by the system of FIG. 1 are shown in heavy lines in FIGS. 2a—2d. In first gear (FIG. 2a) the clutch K1 and the brake B2 are actuated; freewheel F1 is also operative before brake B2 takes effect. With sun gear S1 floating, output shaft IV is driven at a transmission ratio determined exclusively by the parameters of gear train U2.

In second gear (FIG. 2b) clutch K1 is closed, as are brakes B1 and B1F. Output shaft IV rotates at a speed determined exclusively by the parameters of gear train U1, ring gear H2 being kept floating.

In third gear (FIG. 2c) the two clutches K1 and Kb operate concurrently to rigidify the gear train U1 whereby shafts J, I, II and IV rotate in unison.

In reverse (FIG. 2d) clutch K2 and brake B2 are actuated while ring gear H1 and sun gear S2 float. These latter gears, however, do intervene in the power train through their joint engagement, via the respective planet gears P1 and P2, with the interconnected planet carriers ST1 and ST2.

Figure 3:
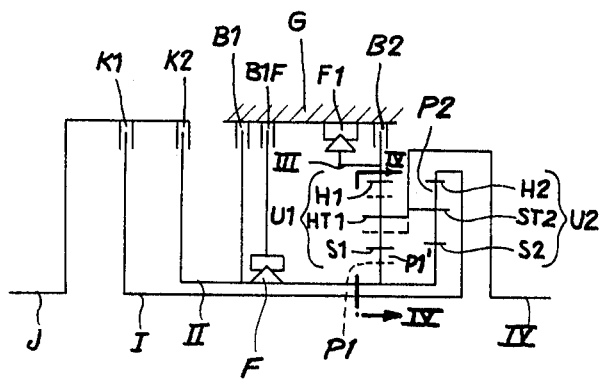
FIG. 3 is a view similar to FIG. 1, illustrating a second embodiment.
Figure 4:
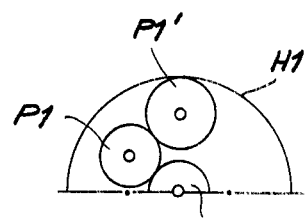
FIG. 4 is a cross-sectional view taken on the line IV-IV of FIG. 3.

The arrangement of FIGS. 3 and 4 differs from the previous embodiment in that the first gear train U1 has two sets of meshing planet gears P1, P1', only one gear of each set being shown in FIG. 4; planet gear P1 also engages the sun gear S1 whereas planet gear P1' is in mesh with ring gear H1. Shaft I is rigid with the second ring gear H2, rather than with the first ring gear H1 which now has a body III arrestable by freewheel F1 and brake B2. Shaft II is rigid with sun gear S1, as before, as well as with sun gear S2 which has been separated from ring gear H1.

The operation of this system is basically the same as that of the first embodiment and will be understood with reference to FIGS. 2a—2d.

Figure 5:
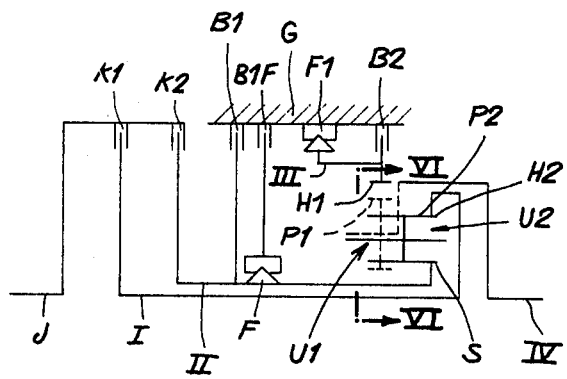
FIG. 5 is a view similar to FIG. 3, illustrating a modification.
Figure 6:
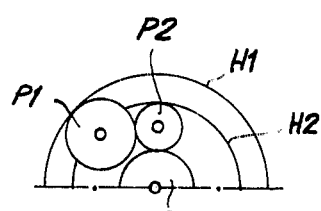
FIG. 6 is a view similar to FIG. 4, taken on the line VI-VI of FIG. 5.

As illustrated in FIGS. 5 and 6, the two sun gears S1 and S2 of FIGS. 3 and 4 have been merged into a single, wider sun gear S on shaft II, this gear meshing with planet gear P2 of gear train U2 which is also engaged by ring gear H2 of that gear train. Planet gear P1 of gear train U1 is in mesh with planet gear P2 as well as with ring gear H2. The operation is the same as in the preceding embodiment; the simplification achieved with the use of a single sun gear diminishes, however, the choice of design parameters as compared with FIGS. 3 and 4 where the two sun gears could have different diameters and the size of planet gear P2 could also be chosen independently of planet gears P1, P1'. Thus, the system of FIGS. 5 and 6 necessitates ring gears H1, H2 of different diameters; in the embodiments of FIGS. 1—4, on the other hand, the radius of the first sun gear S1 (driven from shaft J via clutch K2) can be made considerably smaller than that of the second sun gear S2, as shown, whereby ring gears H1 and H2 can have substantially identical radii. Since the transmission ratio of a planetary gear train is determined by the quotient R of its outer and inner radii, a desired relationship $R_1 = nR_2$ for the quotients of the two gear trains U1, U2 can be realized by making the radius of H1 equal to $n$ times that of H2 (with S1 and S2 equal in size) or by making the radius of S2 equal to $n$ times that of S1 (with equal radii for H1 and H2). The latter solution, evidently, entails a considerably smaller disparity between the overall dimensions of the two gear trains so as to be realizable with a substantially more compact structure.

With the stepdown ratios customary in conventional passenger cars and trucks, the speeds of the planet gears will not be greater than four times the speed of input shaft J in any torque-transmitting position.

I claim:
1. An automotive transmission for providing a plurality of speed ratios between an engine-driven input shaft and an output shaft, comprising:
   central gear means including at least one sun gear;
   a first and a second ring gear coaxial with said central gear means;
   first and second planet gear means in driving engagement with said first and second ring gears, respectively, and with said central gear means for providing a first and a second planetary gear train;
   carrier means for said first and second planet gear means interconnected for joint rotation about the axis of said central gear means, said output shaft being fixedly connected with said carrier means for entrainment thereby;
   first clutch means actuatable for operatively coupling said input shaft with one of said ring gears to establish a first, a second and a third forward position;
   second clutch means actuatable for operatively coupling said input shaft with said sun gear to establish the third forward position and a reverse position;
   first brake means actuatable for arresting said sun gear to establish the second forward position;
   and second brake means actuatable for arresting the other of said ring gears to establish the first forward position and said reverse position.

2. A transmission as defined in claim 1 wherein said central gear means includes a second sun gear in mesh with said second planet gear means and operatively coupled with said input shaft upon actuation of one of said clutch means.

3. A transmission as defined in claim 2 wherein said one of said ring gears is said first ring gear and is fixedly secured to said second sun gear for entrainment by said input shaft upon actuation of said first clutch means.

4. A transmission as defined in claim 2 wherein said second sun gear is rigidly connected with said one sun gear for entrainment by said input shaft upon actuation of said second clutch means.

5. A transmission as defined in claim 4 wherein said first planet gear means comprises two interengaging planet gears respectively meshing with said one sun gear and with said first ring gear, said second planet gear means comprising a third planet gear meshing with both said second sun gear and said second ring gear.

6. A transmission as defined in claim 2 wherein said ring gears have substantially identical radii.

7. A transmission as defined in claim 6 wherein said second sun gear is operatively coupled with said input shaft upon actuation of said first clutch means and is of substantially greater radius than said one sun gear.

8. A transmission as defined in claim 1 wherein said first planet gear means comprises a first planet gear in mesh with said first ring gear, said second planet gear means comprising a second planet gear in mesh with said sun gear, said first planet gear and said second ring gear.